July 15, 1958 C. M. GOODWIN 2,843,150

WATER MIXING FAUCET

Filed Dec. 8, 1955 2 Sheets-Sheet 1

Charles M. Goodwin
INVENTOR.

BY Clarence A. O'Brien and Harvey B. Jacobson, Attorneys

July 15, 1958 C. M. GOODWIN 2,843,150
WATER MIXING FAUCET
Filed Dec. 8, 1955
2 Sheets-Sheet 2
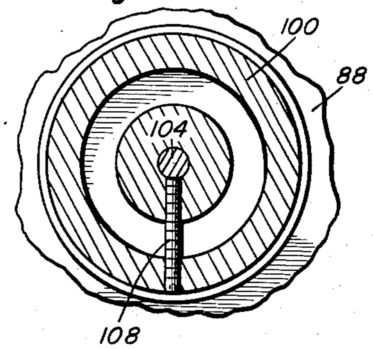
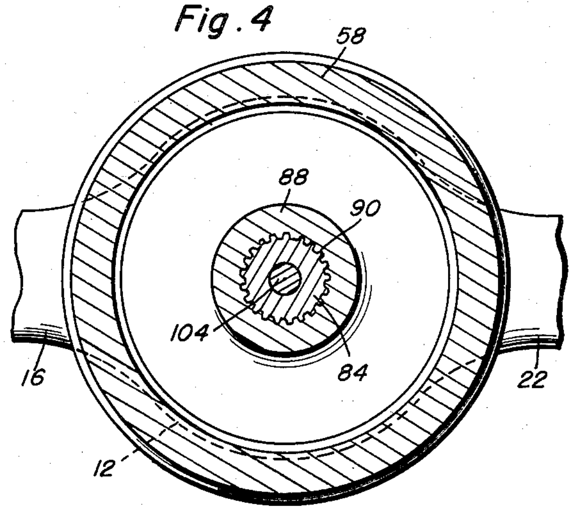
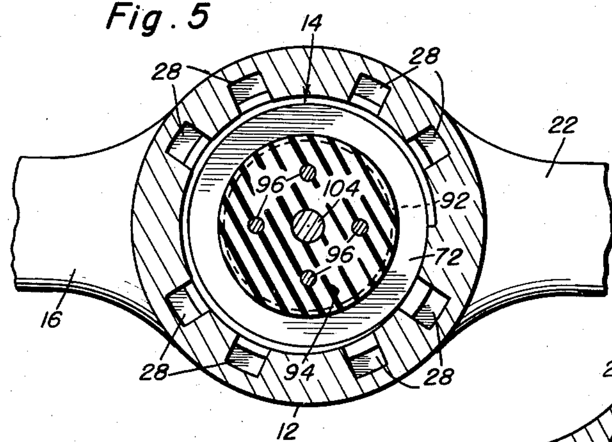
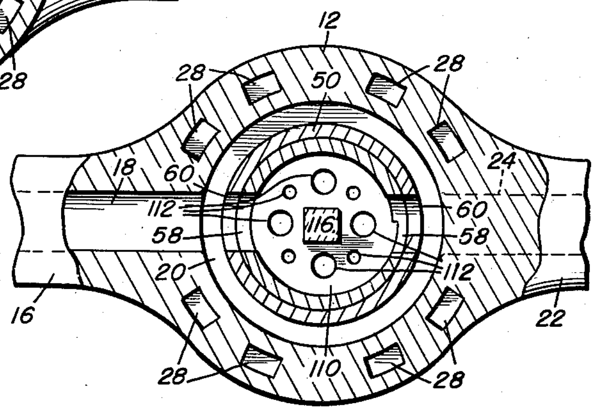
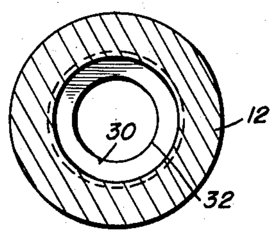
Charles M. Goodwin
INVENTOR.
BY Clarence A. O'Brien
and Harvey B. Jacobson
Attorneys United States Patent Office 2,843,150

Patented July 15, 1958

2,843,150

WATER MIXING FAUCET

Charles M. Goodwin, Mount Vernon, Ohio

Application December 8, 1955, Serial No. 551,911

7 Claims. (Cl. 137—637.2)

This invention relates in general to new and useful improvements in faucets, and more specifically to an improved water mixing faucet.

The primary object of this invention is to provide an improved water mixing faucet which is of extremely simple construction and has a relatively limited number of moving parts, but at the same time permits ready and easy control of the temperature of water flowing therefrom.

Another object of this invention is to provide an improved water mixing faucet which includes a float control valve member resiliently mounted on a valve stem and being retained in place on such valve stem by a second valve stem, the second valve stem controlling a mixture control valve member.

Still another object of this invention is to provide an improved mixing assembly for a water mixing faucet, the mixing assembly including a pair of vertically spaced series of inlet ports and a single valve member movable between and in overlying relation to the series of ports whereby the ports may be selectively opened or closed so as to control the amount of water flowing through the ports.

A further object of this invention is to provide an improved water mixing faucet which includes an insert sleeve assembly which is replaceable whereby when the threads of the sleeve assembly become worn, they may be easily and quickly replaced without the necessity of providing a new faucet.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a fragmentary transverse horizontal sectional view taken substantially upon the plane indicated by the section line 3—3 of Figure 1 and shows the manner in which a control handle is connected to one of the valve stems;

Figure 4 is a transverse horizontal sectional view taken substantially upon the plane indicated by the section line 4—4 of Figure 1 and shows the manner in which a second control handle is connected to another of the valve stems;

Figure 5 is a transverse horizontal sectional view taken substantially upon the plane indicated by the section line 5—5 of Figure 1 and shows the specific details of a resilient pad for resiliently mounting the float control valve member;

Figure 6 is a horizontal sectional view taken substantially upon the plane indicated by the section line 6—6 of Figure 1 and shows the specific details of the replaceable sleeve assembly; and Figure 7 is a horizontal sectional view taken substantially upon the plane indicated by the section line 7—7 of Figure 1 and shows the details of the outlet passage of the faucet.

Figure 1:
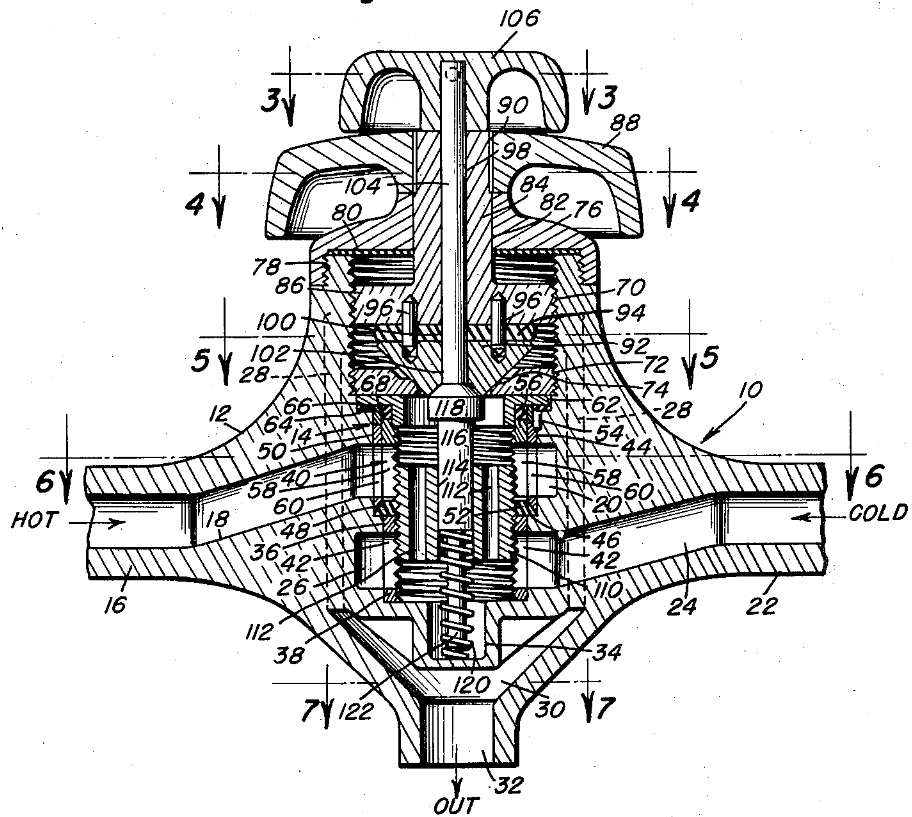
Figure 1 is a vertical sectional view taken through the water mixing faucet which is the subject of this invention and shows the specific details thereof.
Figure 2:
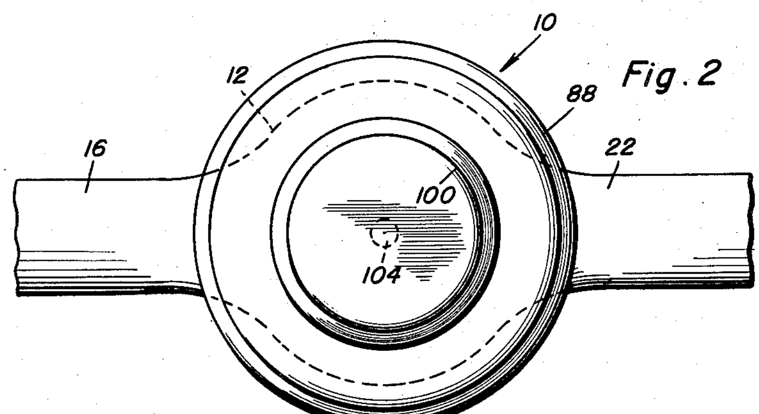
Figure 2 is a top plan view of the water mixing faucet of Figure 1 and shows the general outlines of the exterior thereof.

Referring now to the drawings in detail, it will be seen that there is illustrated the water mixing faucet which is the subject of this invention, the faucet being referred to in general by the reference numeral 10. The faucet 10 includes a body 12 which is generally cruciformed in vertical cross section, as is best illustrated in Figure 1.

The body 12 is provided with a main bore extending vertically from the lower portion thereof and opening through the upper end thereof, the bore being referred to in general by the reference numeral 14. Mounted within the bore 14 are the control elements of the faucet 10, such control elements to be described in more detail hereinafter.

The body 12 includes a first leg portion 16 which is adapted to be connected to a hot water supply line in any conventional manner. Formed in the first leg portion 16 is a hot water inlet passage 18 which terminates in an annular portion 20 encircling the main bore 14.

The body 12 also includes a leg portion 22 which is disposed opposite to the leg portion 16 and which is adapted to be connected to a cold water supply line in any conventional manner. The leg portion 22 includes a cold water supply or inlet passage 24 which terminates in an annular portion 26 encircling the main bore 14. The annular portion 26 is offset from the annular portion 20 and underlies the same.

In order that water may exit from the body 12, there is formed in the body 12 a plurality of circumferentially spaced vertical outlet passages 28 which are communicated with the upper portion of the main bore 14. The vertical outlet passages 28 are staggered so as to miss the inlet passages 18 and 24 and open at their lower ends into a collector area 30 which in turn opens into a lower outlet passage 32 which is in the lower end of the body 12 and which communicates with the exterior thereof.

The lower end of the main bore 14 is in the form of a centrally located seat 34. The seat 34 is of a relatively small diameter and opens into a lower portion 36 of the bore 14, the lower portion 36 being generally within the confines of the annular portion 26 of the inlet passage 24. Removably seated in the lower portion 36 is an internally threaded insert sleeve 38 which forms a part of a replaceable insert sleeve assembly which is referred to in general by the reference numeral 40. The insert sleeve 38 is provided with a pair of diametrically opposite cold water inlet ports 42 which communicate the annular portion 26 with the main bore 14.

The main bore 14 includes an intermediate portion 44 which is disposed immediately above the lower portion 36 and is of a slightly larger diameter than the diameter of the lower portion 36. Due to the difference in diameters between the lower portion 36 and the intermediate portion 44 of the main bore 14, there is provided a shoulder 46. Seated on the shoulder 46 and the upper end of the insert sleeve 38 is a sealing washer 48 which is also internally threaded. The threads of the sealing washer 48 align with the threads of the insert sleeve 38.

The insert sealing washer 48, which functions as a contracting thread seal section, is retained in place by a wedge sleeve 50 which has a tapered lower end 52 wedgedly engaging the exterior periphery of the sealing washer 48. The wedge sleeve 50 is locked against rotation in the body 12 by means of a locking pin 54.

Seated within the wedge sleeve 50 and resting upon the sealing washer 48 is an upper internally threaded insert sleeve 56. The insert sleeve 56 is provided with diametrically opposite hot water inlet ports 58 which are aligned with inlet ports 60 in the wedge sleeve 50. The internal threads of the insert sleeve 56 are aligned with the threads of the insert sleeve 38.

Overlying the insert sleeve 56 and the wedge sleeve 50 is a retaining disk 62. The retaining disk 62 is sealed with respect to the valve body 12 by means of an annular gasket 64. It is also sealed with respect to the insert sleeve 56 by a suitable annular sealing ring 66. A spring member 68 is disposed between the underside of the retaining disk 62 and the upper edge of the wedge sleeve 50 to retain the wedge sleeve 50 in place.

The main bore 14 also includes an enlarged internally threaded upper portion 70. Threadedly engaged in the upper portion 70 is a valve seat member 72 which includes a valve seat portion 74. The valve seat member 72 engages the upper surface of the retaining disk 62 and retains it in place.

The upper end of the main bore 14 is closed by a cap 76. The cap 76 is threadedly engaged with an externally threaded portion 78 of the body 12 and is sealed with respect to the upper end of the body 12 by means of a suitable gasket 80.

The cap 76 is provided with a centrally located bore 82 therethrough in which there is received an intermediate portion of a valve stem 84. The valve stem 84 terminates at its lower end in an enlarged portion 86 which is threadedly engaged with the upper portion 70. Connected to the upper end of the valve stem 84, which will be considered a first valve stem, is a control handle 88. The control handle 88 is connected to the valve stem 84 by means of a splined connection 90.

Disposed in the upper portion 70 of the main bore 14 above the valve seat forming member 72 is a conical valve member 92 which will be considered a float control valve member. A valve member 92 is separated from the enlarged portion 86 of the valve stem 84 by a resilient pad 94 so as to be resiliently mounted. The valve member 92 is connected to the valve stem 84 for rotation therewith by a plurality of pins 96 which pass through the resilient pad 94.

The valve stem 84 is provided with a bore 98 therethrough. Similar bores 100 and 102 extend through the resilient pad 94 and the valve member 92, respectively. Passing through the aligned bores 98, 100 and 102 is a second valve stem 104. The valve stem 104 extends above the valve stem 84 and has secured to the upper end thereof a control handle 106. As is best illustrated in Figure 3, the control handle 106 is secured to the valve stem 104 by means of a set screw 108.

Threadedly engaged in the replaceable sleeve assembly 40 is a mixture control valve member 110. The mixture control valve member 110 is movable within the replaceable sleeve assembly 40 to selectively close the ports 58 and 42 as desired whereby the amount of cold and hot water entering into the body 12 may be controlled. In order that cold water entering into the main bore 14 below the valve member 110 may pass therethrough, there is provided a plurality of bores 112 in the valve member 110 which extend entirely therethrough. The valve member 110 is provided with a square bore 114 which extends therethrough. Slidably received in the square bore 114 is a square intermediate portion 116 of the valve stem 104. This provides a suitable interlock between the valve member 110 and the valve stem 104.

Disposed directly above the square intermediate portion 116 is an enlarged collar 118. The collar 118 engages the lower side of the valve member 92 and urges it upwardly against the resilient pad 94. The valve stem 104 is urged upwardly by means of a coil spring 120 having its lower end disposed in the seat 34 and the upper end thereof engaging the lower end of the intermediate portion 116. The coil spring 120 is carried by a reduced lower portion 122 of the valve stem 104.

In the operation of the present invention, flow of water through the faucet 10 is controlled by turning the handle 88 so as to seat the valve member 92 on the valve seat 74. By moving the valve member 92 away from the valve seat 74 is desired, the flow of water through the faucet 10 may be controlled to that desired.

The temperature of the water passing through the faucet 10 is controlled by controlling the amount of hot and cold water entering into the faucet 10. This is accomplished by moving the valve member 110 up or down, as is necessary, thus partially blocking either the ports 42 to limit the amount of cold water, or the ports 58 to limit the amount of hot water. The valve member 110 is of such a size and is so positioned with respect to the ports 42 and 58, that all cold water or hot water may be supplied, if desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A mixing faucet comprising a hollow body having a main bore therein, hot and cold water inlet passages in said body communicating with said main bore through inlet ports spaced apart vertically along the axis of said main bore, a lower outlet passage, vertical outlet passages communicating the upper portion of said main bore with said lower outlet passage, a mixture control valve member, said mixture control valve member having a vertical length substantially equal to the vertical distance between centers of said inlet ports and being mounted in said main bore for vertical movement therethrough in the loci of said inlet ports to block said inlet ports as desired, said mixture control member having vertical bores therethrough to permit the passage of water therethrough from one of said inlet ports, a valve seat in said main bore intermediate the flow path therebetween said vertical outlet passages and said inlet ports, a flow control valve member selectively cooperating with said valve seat for controlling the flow of water through said faucet, first control means for positioning said flow control valve member relative to said valve seat, said first control means including a first valve stem journalled in said body and connected to said flow control valve member, second control means for positioning said mixture control valve member relative to said inlet ports, said second control means including a second valve stem journalled in said flow control valve member and connected to said mixture control valve member.

2. A mixing faucet comprising a hollow body having a main bore therein, hot and cold water inlet passages in said body communicating with said main bore through inlet ports spaced apart vertically along the axis of said main bore, a lower outlet passage, vertical outlet passages communicating the upper portion of said main bore with said lower outlet passage, a mixture control valve member, said mixture control valve member having a vertical length substantially equal to the vertical distance between centers of said inlet ports and being mounted in said main bore for vertical movement therethrough in the loci of said inlet ports to block said inlet ports as desired, said mixture control member having vertical bores therethrough to permit the passage of water therethrough from one of said inlet ports, a valve seat in said main bore intermediate the flow path therebetween said vertical outlet passages and said inlet ports, a flow control valve member selectively cooperating with said valve seat for controlling the flow of water through said faucet, first control means for positioning said flow control valve member relative to said valve seat, said first control means including a first valve stem journalled in said body and connected to said flow control valve member, second control means for positioning said mixture control valve member relative to said inlet ports, said second control means including a second valve stem journalled in said flow control valve member and connected to said mixture control valve member, said flow control valve member being resiliently carried by said first valve stem, said second valve stem engaging said flow control valve member and having an enlarged portion retaining said flow control valve member in place on said first valve stem.

3. A mixing faucet comprising a hollow body having a main bore therein, hot and cold water inlet passages in said body communicating with said main bore through inlet ports spaced apart vertically along the axis of said main bore, a lower outlet passage, vertical outlet passages communicating the upper portion of said main bore with said lower outlet passage, a mixture control valve member, said mixture control valve member having a vertical length substantially equal to the vertical distance between centers of said inlet ports and being mounted in said main bore for vertical movement therethrough in the loci of said inlet ports to block said inlet ports as desired, said mixture control member having vertical bores therethrough to permit the passage of water therethrough from one of said inlet ports, a valve seat in said main bore intermediate the flow path therebetween said vertical outlet passages and said inlet ports, a flow control valve member selectively cooperating with said valve seat for controlling the flow of water through said faucet, first control means for positioning said flow control valve member relative to said valve seat, said first control means including a first valve stem journalled in said body and connected to said flow control valve member, second control means for positioning said mixture control valve member relative to said inlet ports, said second control means including a second valve stem journalled in said flow control valve member and connected to said mixture control valve member, said flow control valve member being resiliently carried by said first valve stem, said second valve stem engaging said flow control valve member and having an enlarged portion retaining said flow control valve member in place on said first valve stem, means carried by said body and engaging an inner end of said second valve stem to resiliently urge said second valve stem toward said flow control valve member.

4. A mixing faucet comprising a hollow body having a main bore therein, hot and cold water inlet passages in said body communicating with said main bore through inlet ports spaced apart vertically along the axis of said main bore, a lower outlet passage, vertical outlet passages communicating the upper portion of said main bore with said lower outlet passage, a mixture control valve member, said mixture control valve member having a vertical length substantially equal to the vertical distance between centers of said inlet ports and being mounted in said main bore for vertical movement therethrough in the loci of said inlet ports to block said inlet ports as desired, said mixture control member having vertical bores therethrough to permit the passage of water therethrough from one of said inlet ports, a valve seat in said main bore intermediate the flow path therebetween said vertical outlet passages and said inlet ports, a flow control valve member selectively cooperating with said valve seat for controlling the flow of water through said faucet, first control means for positioning said flow control valve member relative to said valve seat, said first control means including a first valve stem journalled in said body and connected to said flow control valve member, second control means for positioning said mixture control valve member relative to said inlet ports, said second control means including a second valve stem journalled in said flow control valve member and connected to said mixture control valve member, said flow control valve member being resiliently carried by said first valve stem with a resilient pad disposed between said flow control valve member and said first valve stem, said second valve stem engaging said flow control valve member and having an enlarged portion retaining said flow control valve member in place on said first valve stem.

5. A mixing faucet comprising a hollow body having a main bore therein, hot and cold water inlet passages in said body communicating with said main bore through inlet ports spaced apart vertically along the axis of said main bore, a lower outlet passage, vertical outlet passages communicating the upper portion of said main bore with said lower outlet passage, a mixture control valve member, said mixture control valve member having a vertical length substantially equal to the vertical distance between centers of said inlet ports and being mounted in said main bore for vertical movement therethrough in the loci of said inlet ports to block said inlet ports as desired, said mixture control valve member mounted in said main bore for movement therethrough to selectively close said inlet ports, said mixture control member having vertical bores therethrough to permit the passage of water therethrough from one of said inlet ports, a valve seat in said main bore intermediate the flow path therebetween said vertical outlet passages and said inlet ports, a flow control valve member selectively cooperating with said valve seat for controlling the flow of water through said faucet, first control means for positioning said flow control valve relative to said valve seat, said first control means including a first valve stem journalled in said body and connected to said flow control valve member, second control means for positioning said mixture control valve member relative to said inlet ports, said second control means including a second valve stem journalled in said flow control valve member and connected to said mixture control valve member, said flow control valve member being resiliently carried by said first valve stem, said second valve stem engaging said flow control valve member and having an enlarged portion retaining said flow control valve member in place on said first valve stem, said first valve stem being threadedly engaged in said body.

6. A mixing faucet comprising a hollow body having a main bore therein, hot and cold water inlet passages in said body communicating with said main bore through inlet ports spaced apart vertically along the axis of said main bore, a lower outlet passage, vertical outlet passages communicating the upper portion of said main bore with said lower outlet passage, a mixture control valve member, said mixture control valve member having a vertical length substantially equal to the vertical distance between centers of said inlet ports and being mounted in said main bore for vertical movement therethrough in the loci of said inlet ports to block said inlet ports as desired, said mixture control member having vertical bores therethrough to permit the passage of water therethrough from one of said inlet ports, a valve seat in said main bore intermediate the flow path therebetween said vertical outlet passages and said inlet ports, a flow control valve member selectively cooperating with said valve seat for controlling the flow of water through said faucet, first control means for positioning said flow control valve member relative to said valve seat, said first control means including a first valve stem journalled in said body and connected to said flow control valve member, second control means for positioning said mixture control valve member relative to said inlet ports, said second control means including a second valve stem journalled in said flow control valve member and connected to said mixture control valve member, said flow control valve member being resiliently carried by said first valve stem, said second valve stem engaging said flow control valve member and having an enlarged portion retaining said flow control valve member in place on said first valve stem, means resiliently urging said second valve stem towards said flow control valve member, said second valve stem being interlocked with and slidable relative to said mixture control valve member.

7. A mixing faucet comprising a hollow body having a main bore therein, hot and cold water inlet passages in said body communicating with said main bore through inlet ports spaced apart vertically along the axis of said main bore, a lower outlet passage, vertical outlet passages communicating the upper portion of said main bore with said lower outlet passage, a mixture control valve member, said mixture control valve member having a vertical length substantially equal to the vertical distance between centers of said inlet ports and being mounted in said main bore for vertical movement therethrough in the loci of said inlet ports to block said inlet ports as desired, said mixture control member having vertical bores therethrough to permit the passage of water therethrough from one of said inlet ports, a valve seat in said main bore intermediate the flow path therebetween said vertical outlet passages and said inlet ports, a flow control valve member selectively cooperating with said valve seat for controlling the flow of water through said faucet, first control means for positioning said flow control valve member relative to said valve seat, said first control means including a first valve stem journalled in said body and connected to said flow control valve member, second control means for positioning said mixture control valve member relative to said inlet ports, said second control means including a second valve stem journalled in said flow control valve member and connected to said mixture control valve member, a replaceable sleeve assembly in said main bore, said second control means including said mixture control valve member being threadedly engaged with said sleeve assembly.

References Cited in the file of this patent

UNITED STATES PATENTS 2,572,661 Reeves ---------------- Oct. 23, 1951